United States Patent Office 3,808,256
Patented Apr. 30, 1974

3,808,256
STYRYL DYES
Horst Scheuermann, Ludwigshafen, Germany, assignor to Badische Anilin- & Soda-Fabrik Aktiengesellschaft, Ludwigshafen, Germany
No Drawing. Filed Aug. 18, 1971, Ser. No. 172,935
Claims priority, application Germany, Aug. 27, 1970, P 20 42 498.0
Int. Cl. C07c 121/70
U.S. Cl. 260—465 D
2 Claims

ABSTRACT OF THE DISCLOSURE p-Aminostyryl dyes bearing a benzyl or phenylethyl group and a urethane group as substituents on the amino nitrogen atom. The dyes are eminently suitable for dyeing cellulose esters and polyesters.

The invention relates to dyes having the General Formula I:

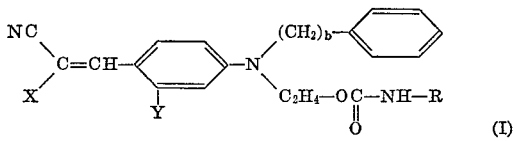

in which

X denotes cyano, carbamoyl or carbalkoxy having two to five carbon atoms;
Y denotes hydrogen, chlorine or methyl;
n denotes 1 or 2; and
R denotes linear or branched alkyl having one to four carbon atoms or β-ethylhexyl, cyclohexyl, benzyl, phenylethyl, phenyl, naphthyl, chlorophenyl, methylphenyl, methoxyphenyl, trifluoromethylphenyl, ethoxyphenyl, dichlorophenyl, dimethylphenyl, carbomethoxyphenyl or cyanophenyl.

Examples of carbalkoxy radicals Y are carbomethoxy, carboethoxy, carboisopropoxy and carbobutoxy.

Examples of alkyl radicals R are methyl, ethyl, n-propyl, isopropyl, n-butyl and isobutyl.

Dyes which are of special importance industrially have the General Formula Ia:

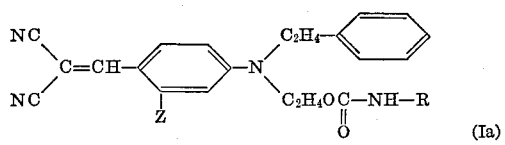

in which Z denotes hydrogen or methyl and R has the meanings given above.

The new dyes are yellow and are outstandingly suitable for dyeing cellulose esters, polymides, acrylonitrile polymers and particularly polyester. Brilliant greenish yellow dyeings having very good general fastness properties are obtained with them. The excellent thermal fastness properties and also light fastness warrant special mention.

The dyes are eminently suitable for dyeing at temperatures above 100° C. and leave the wool component in union cloth of wool and polyester undyed.

Mixed with blue dyes of the anthraquninone series, the new dyes give green dyeings having excellent fastness properties on fibrous material of cellulose esters and polyesters.

Furthermore the dyes have good solubility in organic solvents and are suitable for coloring coating compositions, oils and synthetic fibers and also for dyeing polystyrene and polyethylene. The dyes are moreover soluble with fiber-forming polymers in organic solvents and may be used in the usual way in spin-dyeing processes.

Dyes having the Formula I may be prepared for example by reaction of an aldehyde having the Formula II:

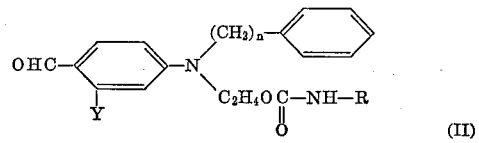

or the corresponding aldimmonium salts having the Formula III:

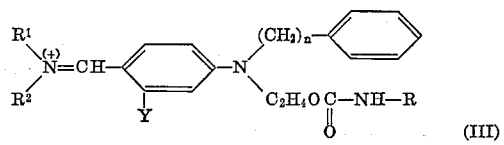

with a methylene compound having the Formula IV:

X, Y, n and R having the the meanings given above $R^1$ denoting alkyl, and $R^2$ denoting alkyl or phenyl.

Compounds having the Formula III are for example accessible by the Vilsmeyer reaction from the corresponding aniline derivatives and N,N-disubstituted amide chlorides. The Compounds II are obtained from the compounds having Formula III during the hydrolysis.

Examples of methylene compounds having the Formula IV are malononitrile, methyl cyanoacetate, ethyl cyanoacetate and butyl cyanoacetate.

A convenient procedure for the production of compounds having the Formula I consists in reacting compounds having the Formula II with compounds having the Formula IV in the presence or absence of solvents at a temperature of from 20° to 150° C., preferably from 60° to 100° C., if desired with the addition of a condensing agent.

The following are examples of solvents which are suitable for the reaction: alcohols such as methanol, ethanol and butanol; glycol ethers such as glycol monomethyl ether; dioxane, tetrahydrofuran, benzene, chlorobenzene, toluene, dimethylformamide, dimethyl sulfoxide, N-methylpyrrolidone, chloroform and ethylene chloride.

Examples of suitable condensing agents for accelerating the reaction are piperidine, morpholine, triethylamine, diethylamine, hexamethylenimine, potassium hydroxide, sodium hydroxide, potassium alcoholate and sodium alcoholate.

The following examples illustrate the invention. References to parts and percentages in the following examples relate to weight unless otherwise stated.

EXAMPLE 1

38.8 parts of the aldehyde having the formula:

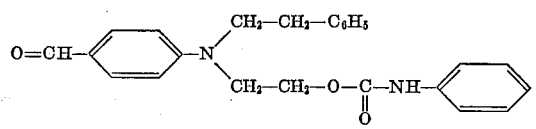

and 7 parts of malononitrile are boiled under reflux in 100 parts of methanol with the addition of 0.2 part of piperidine for three hours. Upon cooling, 36.4 part (83% of theory) of the styryl dye having the formula:

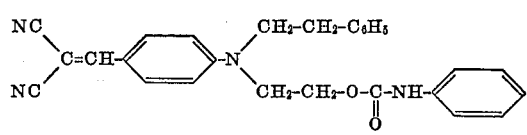

crystallizes out in the form of yellow crystals. The compound melts at 118° to 120° C.

EXAMPLE 2

40.2 parts of the aldehyde having the formula:

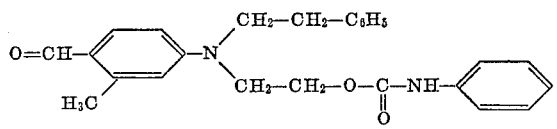

and 7 parts of malononitrile in 120 parts of methanol are boiled under reflux for three hours aftr 0.5 part of piperidine has been added. Upon cooling, 38.8 parts (86% of theory) of the styryl dye having the formula:

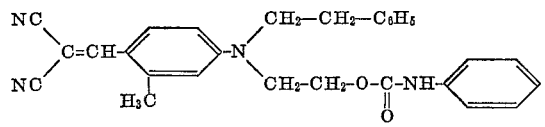

crystallizes out. The dye melts at 149° to 150° C.

The aldehyde required for the production of the dye is prepared as follows:

255 parts of N-β-phenylethyl-N-β-oxyethyl-m-toluidine is dissolved in 250 parts of chlorobenzene and then 119 parts of phenyl isocyanate is gradually added at 90° to 100° C. The whole is stirred for six hours at 95° to 100° C. After this period starting product is no longer detectable by thin layer chromatography. The chlorobenzene is then distilled off at subatmospheric pressure. The syrupy residue is sufficiently pure for the further reactions.

46 parts of phosphorus oxychloride is added at 0° to 5° C. to 22 parts of dimethylformamide in 200 parts of chloroform. The whole is stirred for one hour at 15° to 20° C., and then 74.8 parts of the amine having the formula:

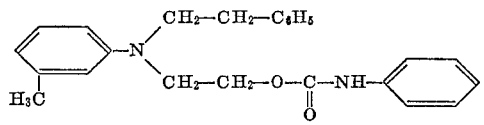

obtained as described above is added and the whole is heated for six hours at 60° to 65° C. The mixture is poured onto 500 parts of ice, made alkaline with 50% caustic soda solution and the chloroform layer is separated off, dried and the chloroform distilled off at subatmospheric pressure. The oily residue has 100 parts of methanol added to it. After stirring for several hours, the aldehyde having the formula:

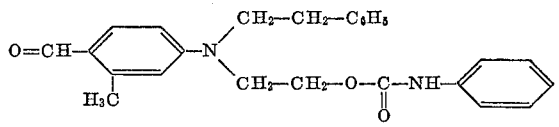

crystallizes out. 58 parts (72% of theory) of the aldehyde is obtained which melts at 120° to 122° C.

EXAMPLE 3

As described in Example 2, 42 parts (93% of theory) of the styryl dye having the formula:

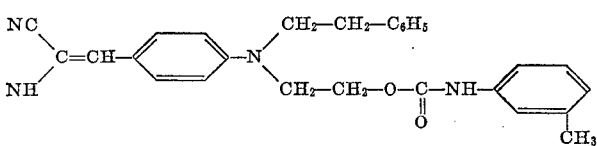

is obtained from 40.2 parts of the aldehyde having the formula:

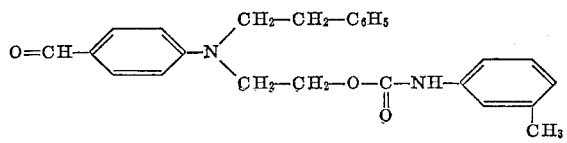

and 7 parts of malononitrile. The compound melts at 106° to 108° C.

EXAMPLE 4

From 41.6 parts of the aldehyde having the formula

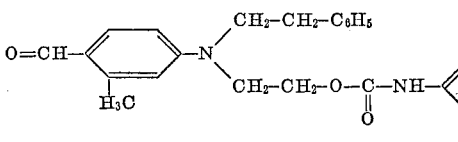

and 7 parts of malononitrile, 39.5 parts (85% of theory) of the styryl dye having the formula:

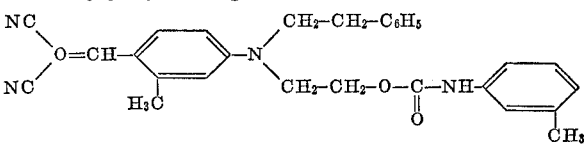

is obtained analogously to Example 2. The compound melts at 167° to 168° C.

EXAMPLE 5

From 41.6 parts of the aldehyde having the formula:

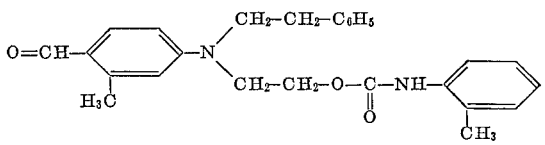

and 7 parts of malononitrile, 35.8 parts (77% of theory) of the styryl dye having the formula:

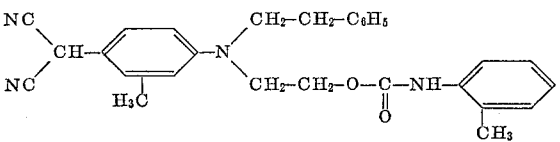

is obtained analogously to Example 2. The compound melts at 143° to 145° C.

EXAMPLE 6

From 43.7 parts of the aldehyde having the formula:

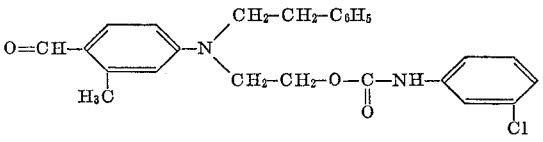

and 7 parts of malononitrile, 40 parts (83% of theory) of the styryl dye having the formula:

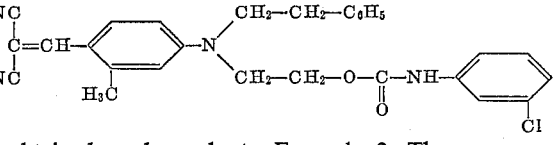

is obtained analogously to Example 2. The compound melts at 184° to 185° C.

EXAMPLE 7

From 47.1 parts of the aldehyde having the formula:

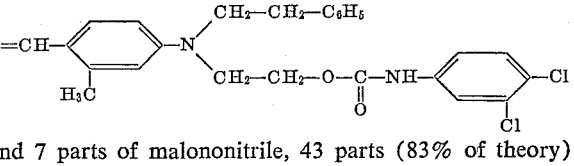

and 7 parts of malononitrile, 43 parts (83% of theory) of the styryl dye having the formula:

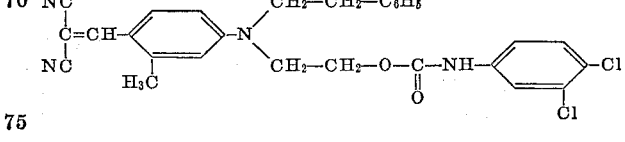

is obtained analogously to Example 2. The compound melts at 156° to 157° C.

EXAMPLE 8

From 47 parts of the aldehyde having the formula:

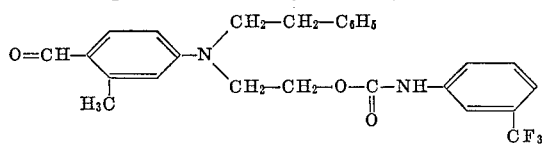

and 7 parts of malononitrile, 46 parts (89% of theory) of the styryl dye having the formula

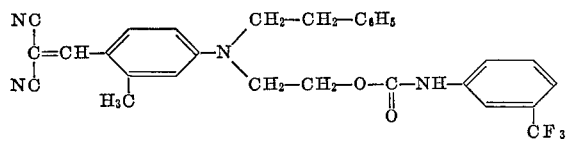

is obtained analogously to Example 2. The compound melts at 158° to 159° C.

EXAMPLE 9

From 41.6 parts of the aldehyde having the formula:

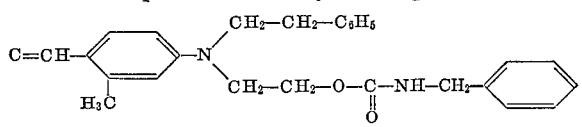

and 7 parts of malononitrile, 34 parts (73% of theory) of the styryl dye having the formula:

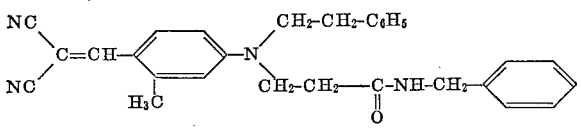

is obtained analogously to Example 2. The compound melts at 151° to 153° C.

EXAMPLE 10

From 40.8 parts of the aldehyde having the formula:

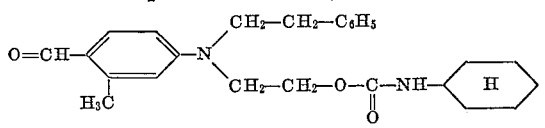

and 7 parts of malononitrile, 32 parts (70% of theory) of the styryl dye having the formula:

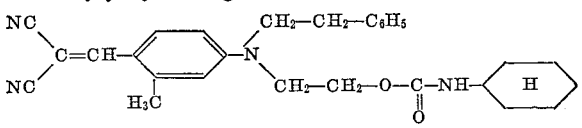

is obtained analogously to Example 2. The compound melts at 122° to 124° C.

EXAMPLE 11

From 36.8 parts of the aldehyde having the formula:

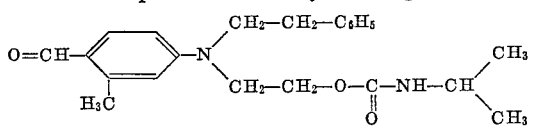

and 7 parts of malononitrile, 33 parts (79% of theory) of the styryl dye having the formula:

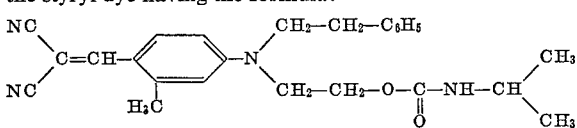

is obtained analogously to Example 2. The compound melts at 136° to 138° C.

EXAMPLE 12

From 37.4 parts of the aldehyde having the formula:

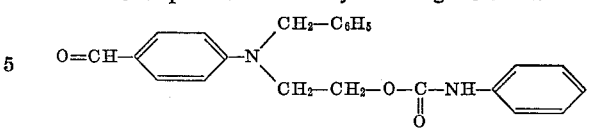

and 7 parts malononitrile, 32 parts (76% of theory) of the styryl dye having the formula:

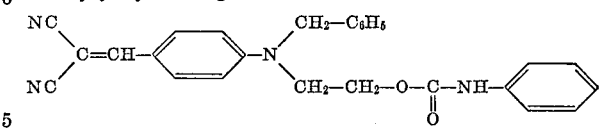

is obtained analogously to Example 2. The compound melts at 119° to 120° C.

EXAMPLE 13

From 40.8 parts of the aldehyde having the formula:

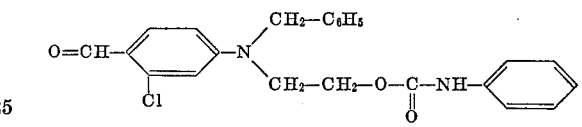

and 7 parts of malononitrile, 33 parts (73% of theory) of the styryl dye having the formula:

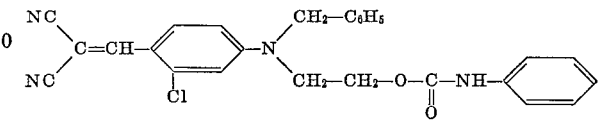

is obtained analogously to Example 2. The compound melts at 150° to 152° C.

EXAMPLE 14

From 38.8 parts of the aldehyde having the formula:

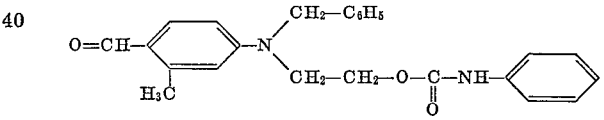

and 7 parts of malononitrile, 30 parts (60% of theory) of the styryl dye having the formula:

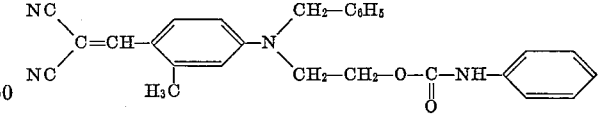

is obtained analogously to Example 2. The compound melts at 156° to 158° C.

EXAMPLE 15

30 parts of phosgene is added at 0° to 5° C. to 22 parts of dimethylformamide in 200 parts of chloroform and the whole is stirred for another hour at 15° to 20° C. 112 parts of the amine having the formula:

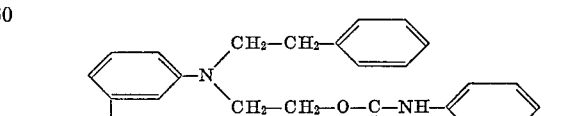

is added and the solution is heated for ten hours at 60° to 65° C. After the addition of 20 parts of malononitrile and 50 parts of anhydrous sodium acetate, the whole is heated for another four hours at 60° to 65° C. The mixture is then poured onto 600 parts of ice and a pH of 10 is set up with 2 N caustic soda solution. The chloroform layer is separated, dried and the chloroform distilled off at subatmospheric pressure. 200 parts of methanol is added to the syrupy residue and the whole is stirred for two hours at room temperature. The crystalline precipitate is then suction filtered, washed with methanol and dried. 75 parts (56% of theory) of the styryl dye described in Example 2 is obtained. The compound melts at 147° to 149° C.

Dye characterized by their substituents in the following table are obtained in a manner analogous to that described above.

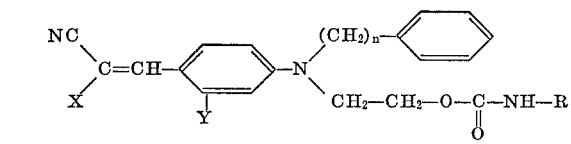

| Example | X | Y | n | R |
|---|---|---|---|---|
| 16 | CN | CH₃ | 2 | —CH(C₂H₅)(CH₃) |
| 17 | CN | CH₃ | 2 | —C₄H₉ |
| 18 | CN | CH₃ | 2 | —CH₂—CH(C₂H₅)(C₄H₉) |
| 19 | CN | CH₃ | 2 | —CH₂—CH₂—C₆H₅ |
| 20 | CN | CH₃ | 2 | —C₆H₄—OCH₃ |
| 21 | CN | H | 2 | Same as above. |
| 22 | CN | CH₃ | 2 | —C₆H₃(CH₃)₂ |
| 23 | CN | CH₃ | 2 | —C₆H₄—CN |
| 24 | CN | CH₃ | 2 | —C₆H₄—CN |
| 25 | CN | CH₃ | 2 | —C₆H₄—CO₂CH₃ |
| 26 | CO₂CH₃ | CH₃ | 2 | —C₆H₅ |
| 27 | CO₂C₂H₅ | CH₃ | 2 | Same as above. |
| 28 | CO₂C₃H₇(i) | CH₃ | 2 | —C₆H₄—CH₃ |
| 29 | CO₂C₄H₉ | CH₃ | 2 | Same as above. |
| 30 | CN | Cl | 2 | —CH₃ |
| 31 | CN | Cl | 2 | —C₆H₅ |
| 32 | CN | Cl | 2 | —C₆H₄—CH₃ |
| 33 | CN | CH₃ | 1 | —C₃H₇ |
| 34 | CN | CH₃ | 1 | —C₄H₉ |
| 35 | CN | CH₃ | 1 | —CH₂—CH(CH₂CH₃)(C₄H₉) |
| 36 | CN | CH₃ | 1 | —C₆H₃Cl₂ |
| 37 | CN | CH₃ | 1 | —C₆H₄—CH₃ |
| 38 | CO₂C₂H₅ | CH₃ | 1 | —C₆H₅ |
| 39 | CO₂C₂H₅ | Cl | 1 | —C₆H₄—Cl |
| 40 | CO₂C₂H₅ | H | 1 | —C₆H₅ |
| 41 | CO₂C₄H₉ | H | 1 | —C₆H₃Cl₂ |
| 42 | CN | H | 2 | —C₆H₄—Cl |
| 43 | CN | H | 2 | —C₆H₃Cl₂ |
| 44 | CN | H | 2 | —C₆H₃(CH₃)₂ |
| 45 | CN | H | 2 | —C₆H₄—OC₂H₅ |
| 46 | CO₂C₂H₅ | CH₃ | 2 | —CH(CH₃)₂ |
| 47 | CO₂C₂H₅ | H | 2 | —C₄H₉ |
| 48 | CO₂C₃H₇ | CH₃ | 2 | —CH₃ |
| 49 | CO₂C₄H₉ | CH₃ | 2 | —C₂H₅ |
| 50 | CO₂C₄H₉ | Cl | 2 | —C₂H₅ |
| 51 | CN | CH₃ | 2 | —CH₃ |
| 52 | CN | CH₃ | 2 | —C₆H₃Cl₂ |
| 53 | CN | CH₃ | 2 | —C₂H₅ |
| 54 | CONH₂ | CH₃ | 2 | —CH₃ |
| 55 | CONH₂ | CH₃ | 2 | —CH(CH₃)₂ |
| 56 | CONH₂ | CH₃ | 2 | —C₆H₅ |
| 57 | CONH₂ | CH₃ | 2 | —C₆H₄—Cl |
| 58 | CONH₂ | CH₃ | 2 | —CH(CH₃)₂ |
| 59 | CN | CH₃ | 2 | —C₁₀H₇ (naphthyl) |

EXAMPLE 60

47.1 parts of the aldehyde having the formula:

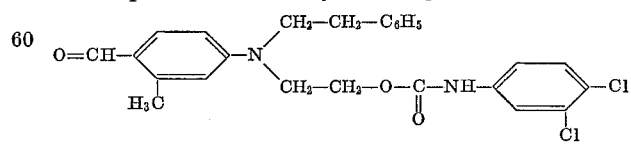

and 10.9 parts of methyl cyanoacetate in 150 parts of methanol are boiled for three hours after the addition of 0.5 part of piperidine. Upon cooling, 53 parts (96% of theory) of the styryl dye having the formula:

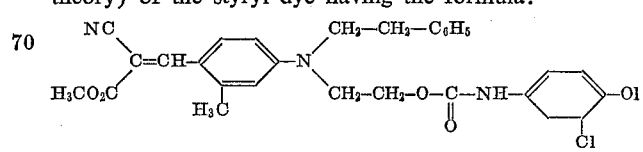

separates out. The dye melts at 150° to 152° C.

EXAMPLE 61

The procedure of Example 60 is adopted but 12.4 parts of ethyl cyanoacetate is used instead of the methyl cyanoacetate. 48 parts (85% of theory) of the dye having the formula:

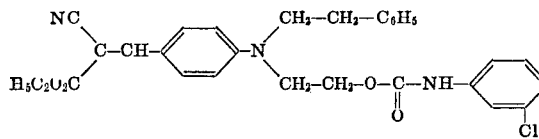

is obtained. The dye melts at 132° to 134° C.

EXAMPLE 62

The procedure of Example 60 is adopted but 15.5 parts of n-butyl cyanoacetate is used instead of methyl cyanoacetate. 49 parts (83% of theory) of the following dye is obtained:

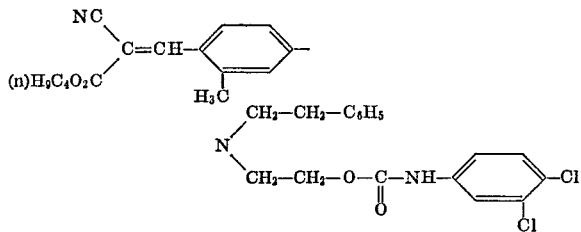

The compound melts at 138° to 140° C.

I claim:
1. A dye of the formula

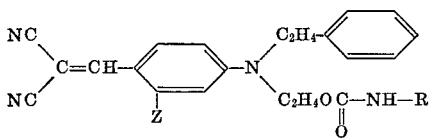

wherein:

Z is hydrogen or methyl; and

R is alkyl of one to four carbon atoms, β-ethylhexyl, cyclohexyl, benzyl, phenylethyl, phenyl, naphthyl, chlorophenyl, methylphenyl, methoxyphenyl, trifluoromethylphenyl, ethoxyphenyl, dichlorophenyl, dimethylphenyl, carbomethoxyphenyl or cyanophenyl.

2. A dye of the formula

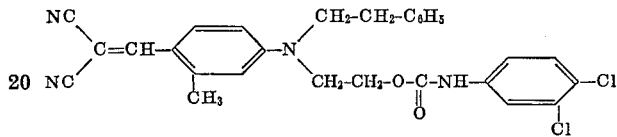

References Cited
UNITED STATES PATENTS 2,850,520   9/1958   Merian et al. _____ 260—465

LEWIS GOTTS, Primary Examiner

DOLPH H. TORRENCE, Assistant Examiner

U.S. Cl. X.R.

8—54.2, 177R, 178R, 179; 260—468C, 471C, 482C

UNITED STATES PATENT OFFICE
CERTIFICATE OF CORRECTION

PATENT NO. : 3,808,256
DATED : April 30, 1974
INVENTOR(S) : Horst Scheuermann

It is certified that error appears in the above-identified patent and that said Letters Patent are hereby corrected as shown below:

In Column 1, Line 23, delete " $(CH_2)_b$ " and substitute -- $(CH_2)_n$ --

In Column 1, Line 65, delete "anthraquininone" and substitute --anthraquinone--

In Column 4, Line 15, delete "O=CH-" and substitute -- C=CH- --

In Column 4, Line 34, delete "CH-" and substitute -- C=CH --

In Column 5, Line 28, delete "C=CH" and substitute -- O=CH --

In Column 8, Line 73 delete " 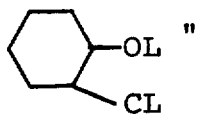 " and substitute -- 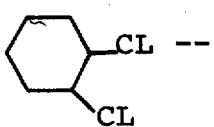 --

Signed and Sealed this

*twenty-second* Day of *June 1976*

[SEAL]

Attest:

RUTH C. MASON
*Attesting Officer*

C. MARSHALL DANN
*Commissioner of Patents and Trademarks*